United States Patent
Brown

[15] 3,681,734
[45] Aug. 1, 1972

[54] HEAT SENSING PROBE
[72] Inventor: Verne R. Brown, Ann Arbor, Mich.
[73] Assignee: Transidyne General Corporation, Ann Arbor, Mich.
[22] Filed: Feb. 16, 1971
[21] Appl. No.: 115,269

[52] U.S. Cl.................................................338/28
[51] Int. Cl. ...............................................H01c 7/00
[58] Field of Search................................338/22–31

[56] References Cited
UNITED STATES PATENTS

| | | | |
|---|---|---|---|
| 3,521,212 | 7/1970 | Waseleski, Jr. et al. | 338/25 |
| 3,019,404 | 1/1962 | Fastenau et al. | 338/28 |
| 3,435,400 | 3/1969 | Beckman | 338/28 |
| 3,103,641 | 9/1963 | Gee | 338/28 |

*Primary Examiner*—D. F. Duggan
*Attorney*—Barnard, McGlynn & Reising

[57] ABSTRACT

In accordance with the invention there is provided a heating sensing probe comprising an electric conductor rod having a tapered portion which terminates in a pointed tip at one end thereof, a film of heat sensitive electrical resistance material on the tapered portion and covering the pointed tip, a film of electrical insulator material on the film of resistance material but not covering the portion of the resistance material on the pointed tip, and a film of metal on the film of insulator material and on the portion of the resistance material which covers the pointed tip of the rod such that the film of metal is in electrical contact with the film of resistance material at the pointed tip but is otherwise electrically insulated from the resistance material and from the rod by the film of insulator material.

5 Claims, 1 Drawing Figure

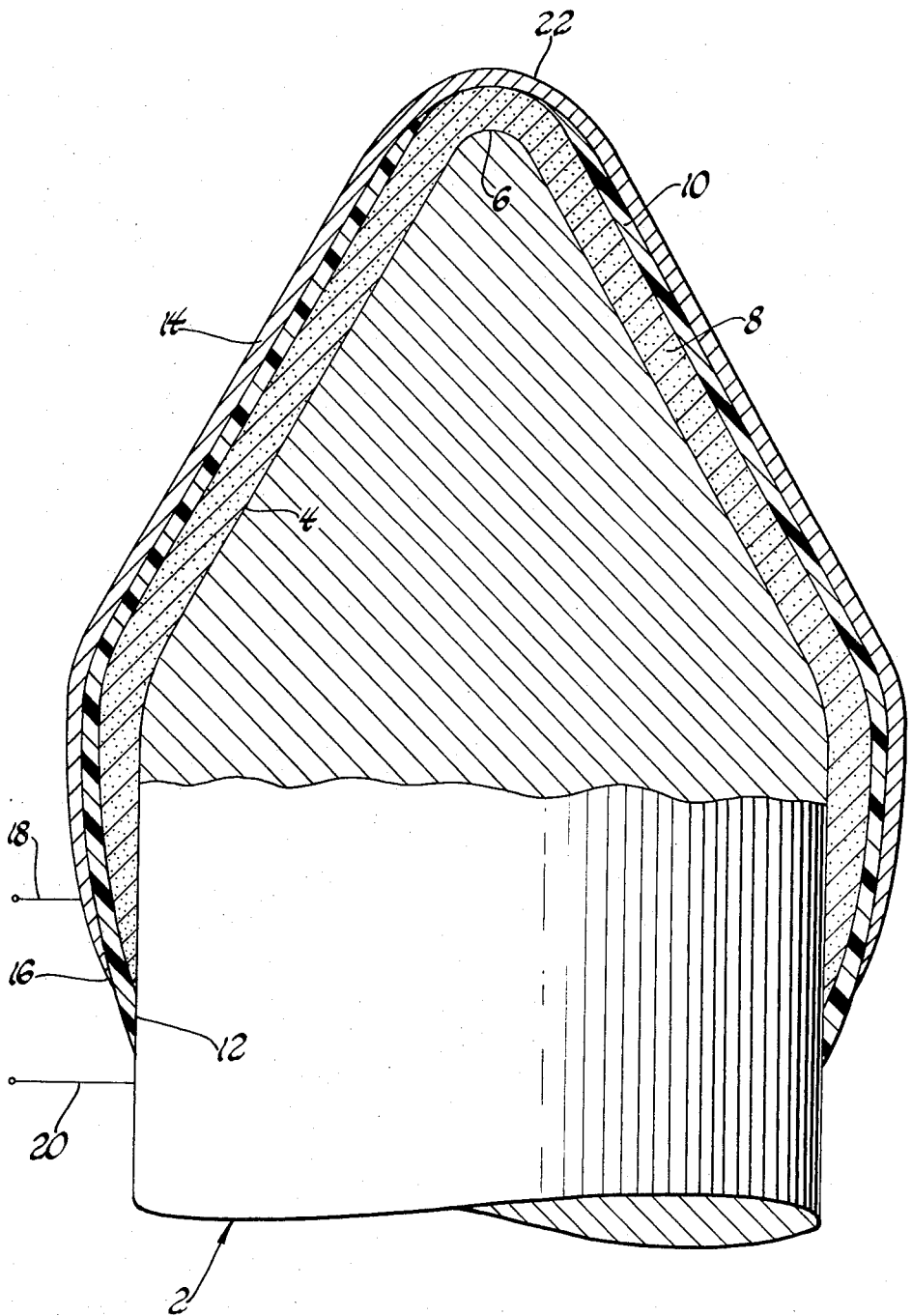

HEAT SENSING PROBE

The subject matter of the present invention is an improved structure and method of manufacture of a heat sensing probe wherein a film of heat sensitive electrical resistance material on the pointed end of the probe serves as the temperature sensing element.

One of the most common and well known types of heat sensing devices is that wherein a body of heat sensitive electrical resistance material, i.e., thermistor material, is utilized as the heat sensing element. Hence, it is commonplace to use as the heat sensing element of a automotive engine temperature gage a block or rod of thermistor material together with the necessary and well known electrical circuitry to translate the electrical resistance of the material into temperature readings. At the present state of the art such heat gages are, however, relatively inaccurate and are subject to a relatively long lag between a change in temperature and a change in the registered temperature reading.

It is an object of the present invention to provide a heat sensing probe which utilizes a thermistor material as the temperature sensitive element but which provides greatly increased sensitivity and accuracy, with minimum time lag between a change in temperature and a change in reading. Another and attendant object is the provision of a method of manufacturing such temperature sensing probes.

Other objects, features and advantages of the invention will appear more clearly from the following detailed description of the preferred embodiment thereof made with reference to the drawing which shows the end portion in enlarged scale and partially in section, of a heat sensing probe embodying and made in accordance with the invention. Referring now to the drawing, the heat sensing probe comprises an electrically conductive rod 2, which can be of stainless steel, tungsten, tungsten carbide or similar conductor material, having a tapered end portion 4 which terminates in a pointed tip 6. The drawing is of greatly enlarged scale; the tapered end of the rod 2 will generally be of a diameter similar to that of a large sewing needle with the extremity of the pointed tip having a radius of about 20 microns or less. Also, it should be understood that a more gradually tapered end portion can be used if desired, the tapered end shape shown being merely illustrative. The tapered end of the rod should have a smooth surface finish, preferably less than 5 microinches (arithmetic average).

The tapered end portion 4, including the tip 6, has deposited thereon a film of heat sensitive electrical resistance material 8. The thickness of the film of heat sensitive resistor material should preferably not exceed about 1 micron. Deposition of the film can be either by way of vapor deposition in a vacuum, as is well known in the art, or by sputtering, for example RF sputtering or cathode sputtering in an argon atmosphere which provides an argon plasma, such techniques also being well known in the art. As the material for the film 8 it is preferred to use a metal oxide or a mixture of metal oxides having thermistor properties, such oxides and mixtures of oxides being well known in the art. For example, mixtures of the transition metal oxides are well known and commonly used as heat sensitive electrical resistance materials, mixtures of $Fe_2O_3$—$Fe_3O_4$ with additions of $MnO_2$, $Mn_2O_3$ or $Cr_2O_3$ being typical. Such mixtures usually result in negative temperature coefficient of resistance film which opposes the positive temperature coefficient of resistance of the metallic conductor rod. The metal oxide itself can be deposited or, alternately, reactive sputtering of a metallic target in a partial pressure of oxygen can be used to prepare the metal oxide layer.

Next, there is deposited over the film 8, except the portion thereof at the pointed tip 6, a film of electrical insulator material 10. The preferred material for the film 10 is polyimide resin. Polyimide resin is presently available on the market from the E. I. DuPont de Nemours Company of Willmington, Del., under the trademark Pyre-M-L. To accomplish the thin film deposition of the resin, there can be applied to the tapered end of the rod a relatively dilute solution of the resin in a suitable organic solvent. I have found that by reason of the inherent tendency of such a solution to draw or flow away from the pointed tip of the rod, the resulting layer of resin terminates short of the pointed tip and hence the portion of the layer 8 at the pointed tip remains uncovered by the resin as shown in the drawing. It should be noted that the film of resin 10 extends below the lower extremity of the film of heat sensitive resistance material 8, the film of the resin being in contact with the rod as shown at 12. The thickness of the film 10 need not be greater than about 0.5 microns though it is essential that the film be entirely free of pinholes. To this end, it is desirable to apply the film in the form of a plurality of layers such that any void or pinhole through one layer is covered by another layer. After the resin is applied it must be cured by heating to a temperature of about 250°C and where the film is deposited in the form of a plurality of layers, each layer applied should be cured by the application of such temperature prior to depositing the next layer.

As the next step in manufacture of the probe, there is deposited over the tapered end thereof, including the tip, a layer of electrically conductive material, preferably metal as shown at 14. The deposition of the layer 14 can be by way of vapor deposition in a vacuum or by means of sputtering as described above. It should be noted, however, that irrespective of the means of deposition used, there must be assurance, as by way of masking, that the layer terminates at its lower end short of the lower terminus of the electrical insulator layer 10. This is shown at 16. Hence, the metal film 14 is in electrical contact with that portion of the layer 8 which is at the pointed tip 6 of the probe but is otherwise electrically insulated from the layer 8 and from the metal rod 2 by means of electrical insulator layer 10.

To afford optimum sensitivity and minimum lag time between a change in temperature and a change in temperature reading, the thickness of the metal film 14 should preferably not exceed about 0.5 microns and should ideally be about 0.2 microns. Any of various metals can be used for the layer 14, platinum being preferred.

As the last essential step in manufacture, suitable electrical connections, diagrammatically shown at 18 and 20, are made to the metal layer 14 and the metal rod 2, respectively, to provide electrical connections with the circuitry required to translate the measured electrical resistance to temperature readings. Such circuitry is well known in the art and generally comprises a bridge circuit. It will be manifest that the temperature sensing portion of the probe is the pointed tip thereof, the resistance measured being that of the portion of the layer 8 between the pointed tip 6 of the rod and the portion 22 of the metal film 14 which is in electrical contact with said portion of the layer 8.

Hence, the invention provides an extremely sensitive temperature measuring probe with minimum lag time between temperature sensing and the temperature reading. The use of resin as the electrical insulator layer is desirable in that in addition to serving as an electrical insulator it also serves as a heat insulator. Also, polyimide resin has relatively high temperature resistance — up to about 700° F — and hence the probe can be used to measure relatively high as well as low temperatures. Further, because of the inherent tendency of the resin solution applied to draw away from and leave bare the pointed tip of the layer 8 of thermistor material, it is possible to manufacture the probe at relatively little expense and complexity as compared with that which would be involved if it were necessary to otherwise seek, as by masking, to prevent deposition of the insulator film over the pointed tip portion of the thermistor film.

The probe is excellent in biomedical research work for accurate measurement of temperature in localized small areas because the probe has good strength and yet, because of the taper and with only the tip being temperature sensitive, there can be precise resolution of the temperature region. The probe is also useful for precise measurement of temperature, and temperature changes, of gas flowing through a conduit since the probe can be located in the conduit transverse thereto, and to the flow of gas, and yet without causing any turbulence, this because of the very small diameter of the probe.

It will be understood that while the invention has been described specifically with reference to a preferred embodiment thereof, various changes and modifications may be made all within the full and intended scope of the claims which follow.

The embodiments of the invention in which an exclusive property or privilege is claimed are defined as follows:

1. A heat sensing probe comprising an electrical conductor rod having a tapered portion which terminates in a pointed tip at one end of said rod, a film of heat sensitive electrical resistance material on said tapered portion and covering said pointed tip, a film of electrical insulator material on said film of resistance material, said film of insulator material terminating short of said pointed tip, and a film of electrical conductor material on said film of insulator material and on the portion of said film of resistance material which covers the pointed tip of said rod whereby said film of electrical conductor material is in electrical contact with said film of resistance material at said pointed tip, said film of electrical conductor material being otherwise electrically insulated from said film of resistance material and from said rod by said film of insulator material.

2. A heat sensing probe as set forth in claim 1 wherein said film of heat sensitive resistance material comprises a film of metal oxide having a thickness not exceeding about one micron.

3. A heat sensing probe as set forth in claim 1 wherein said electrical insulator material is polyimide resin.

4. A heat sensing probe as set forth in claim 3 wherein said film of electrical insulator material has a thickness not exceeding about 0.5 microns.

5. A heat sensing probe as set forth in claim 1 wherein the pointed tip of said rod has a radius not exceeding about 20 microns.

* * * * *